(12) United States Patent
Feitl et al.

(10) Patent No.: US 10,816,067 B2
(45) Date of Patent: Oct. 27, 2020

(54) INTEGRATED BALL SCREW LINEAR ACTUATOR

(71) Applicant: NSK Americas, Inc., Ann Arbor, MI (US)

(72) Inventors: John Feitl, Greenwood, IN (US); Koichi Morita, Kanagawa (JP); Takashi Kataoka, Sasebo (JP)

(73) Assignee: NSK Americas, Inc., Ann Arbor, MI (US)

( * ) Notice: Subject to any disclaimer, the term of this patent is extended or adjusted under 35 U.S.C. 154(b) by 0 days.

(21) Appl. No.: 16/086,823

(22) PCT Filed: Mar. 23, 2017

(86) PCT No.: PCT/US2017/023790
§ 371 (c)(1),
(2) Date: Sep. 20, 2018

(87) PCT Pub. No.: WO2017/165633
PCT Pub. Date: Sep. 28, 2017

(65) Prior Publication Data
US 2019/0107186 A1 Apr. 11, 2019

Related U.S. Application Data

(60) Provisional application No. 62/311,963, filed on Mar. 23, 2016.

(51) Int. Cl.
*F16H 25/24* (2006.01)
*F16D 1/092* (2006.01)
(Continued)

(52) U.S. Cl.
CPC ............. *F16H 25/24* (2013.01); *F16D 1/092* (2013.01); *F16D 1/096* (2013.01);
(Continued)

(58) Field of Classification Search
CPC ..... F16H 25/24; F16H 25/2204; H02K 11/21; F16D 1/096
See application file for complete search history.

(56) References Cited

U.S. PATENT DOCUMENTS

| 1,709,981 A | 4/1929 | Vickers |
| 3,192,791 A | 7/1965 | Greby |

(Continued)

FOREIGN PATENT DOCUMENTS

| EP | 1320174 A1 | 6/2003 |
| EP | 2056430 A2 | 5/2009 |

(Continued)

OTHER PUBLICATIONS

International Search Report and Written Opinion for International Application No. PCT/US2017/023790; dated Jun. 28, 2017.

(Continued)

*Primary Examiner* — David M Fenstermacher
(74) *Attorney, Agent, or Firm* — The Dobrusin Law Firm, P.C.

(57) ABSTRACT

A linear actuation screw having a first end portion, a second end portion on an opposite side as the first end portion, and a sloping intermediate portion between the first end portion and second end portion. The first end portion has a threaded outer wall having a generally constant first diameter over at least a portion of its length and is configured to advance a nut or a sliding member along at least a portion of the first end portion. The second end portion has a threaded outer wall having a generally constant second diameter that is different from the first diameter and is configured to receive a motor fastening nut around it in order to secure the linear actuation screw to a motor. The sloping intermediate portion includes an outer wall that is generally smooth and continuous over at least a majority of the area of the outer wall.

20 Claims, 5 Drawing Sheets

(51) Int. Cl.

| | | |
|---|---|---|
| *F16H 25/22* | (2006.01) | |
| *H02K 7/06* | (2006.01) | |
| *H02K 11/21* | (2016.01) | |
| *H02K 7/00* | (2006.01) | |
| *F16D 1/096* | (2006.01) | |
| *F16H 25/20* | (2006.01) | |
| *F16B 3/06* | (2006.01) | |

(52) U.S. Cl.
CPC ......... *F16H 25/2204* (2013.01); *H02K 7/003* (2013.01); *H02K 7/06* (2013.01); *H02K 11/21* (2016.01); *F16B 3/06* (2013.01); *F16H 2025/204* (2013.01); *F16H 2025/2075* (2013.01)

(56) References Cited

U.S. PATENT DOCUMENTS

| | | | |
|---|---|---|---|
| 4,753,122 A * | 6/1988 | Nishikawa | F16H 25/2009 |
| | | | 74/424.96 |
| 5,046,377 A * | 9/1991 | Wilkes | E05B 81/25 |
| | | | 384/129 |
| 6,791,220 B1 | 9/2004 | Suzuki et al. | |
| 7,541,707 B2 | 6/2009 | Hochhalter et al. | |
| 2003/0111924 A1 | 6/2003 | Ma et al. | |
| 2009/0165581 A1 * | 7/2009 | Koyagi | F16H 25/2015 |
| | | | 74/89.23 |
| 2009/0260463 A1 * | 10/2009 | Fukano | F16H 25/2454 |
| | | | 74/89.33 |
| 2012/0024103 A1 * | 2/2012 | Matsuno | B62D 1/181 |
| | | | 74/499 |
| 2012/0146439 A1 | 6/2012 | Gibas et al. | |
| 2012/0325036 A1 * | 12/2012 | Harada | B21K 1/70 |
| | | | 74/424.86 |
| 2014/0300228 A1 | 10/2014 | Rapp et al. | |
| 2015/0003906 A1 | 1/2015 | Johnson | |
| 2015/0047444 A1 | 2/2015 | Tsai et al. | |
| 2015/0323050 A1 * | 11/2015 | Ohno | F16H 25/20 |
| | | | 74/434 |

FOREIGN PATENT DOCUMENTS

| | | |
|---|---|---|
| JP | H0957667 A | 3/1997 |
| WO | 2017/042546 A1 | 3/2017 |

OTHER PUBLICATIONS

Monocarrier Catalog, 2007 (49 pages); last accessed Sep. 20, 2018, at http://www.nsk.com/common/data/ctrgPdf/e3419a.pdf.

* cited by examiner

INTEGRATED BALL SCREW LINEAR ACTUATOR

FIELD

In general, the present teachings relate to an improved linear actuation screw for use in a linear actuator, and particularly to a ball screw and that directly connects to a motor in a linear actuation system.

BACKGROUND

It is common in the linear actuator field to employ a threaded screw that is rotated (e.g., by a motor) for causing a linear guide to translate along the length of the threaded screw. Essentially a rotary motion of the screw is converted to a linear motion of the linear guide. For this purpose, it has been common to employ a ball recirculation system for facilitating the actuation.

Common linear actuator systems include a screw shaft which is supported by rolling bearings in an intermediate support unit, a screw nut, a linear sliding part which is combined with the screw nut, a linear rail, a support unit, a rotary motor, a motor bracket, and a coupling for connecting the screw shaft and a shaft of the motor. This common system has three rotational parts: the shaft in the motor, the shaft of the screw, and the coupling. The intermediate support unit also has preloaded bearings which support screw shaft rotation movement.

Notwithstanding efforts over the years to improve linear actuators, there still remains a need for simplifying the design and more easily and accurately connecting the screw to the motor. There also remains a need for reducing the footprint of the linear actuator. There further remains a need for decreasing assembly time by reducing the number of parts. There is also a need for reducing or eliminating misalignment between the coupling, the screw shaft, and the motor rotation shaft.

The following U.S. patent document may be related to the present teachings: U.S. Pat. No. 3,192,791, all of which is incorporated by reference herein for all purposes. Also potentially related to the present teachings is a product available commercially from NSK Ltd. under the name "Monocarrie™", which is a linear motion product that includes a ball screw, a linear rail and a slider that is slidingly attached to the rail.

SUMMARY

The present teachings make use of a simple, yet elegant, approach to the construction of an improved linear actuation screw (e.g., for an improved linear actuator). A linear actuator employing the linear actuation screw of the present teachings may have a driver (e.g., a motor) that mates directly with the screw. The screw may have at least one helical thread (e.g., having generally opposing flanks) and a longitudinal axis. The screw may be coupled with the driver (e.g., motor) and in driving relationship with the motor so the motor is adapted to rotate the screw generally about the longitudinal axis of the screw. The linear actuator may include a slider assembly which may be configured for linear translation along the longitudinal axis of the screw.

In accordance with the present teachings, there is thus contemplated a linear actuation screw. The linear actuation screw may include an elongated shaft having a first end portion, a second end portion on an opposite side of the elongated shaft as the first end portion, and a sloping intermediate portion between the first end portion and the second end portion. The first end portion may have a threaded outer wall having a generally constant first diameter (as measured from a crest) over at least a portion of its length. The first end portion may be configured to advance a nut or a sliding member along at least a portion of the first end portion. The second portion may have a threaded outer wall having a generally constant second diameter (e.g., a diameter that is different from the first diameter). The second end portion may be configured to receive a motor fastening nut around it in order to secure the linear actuation screw to a motor. The sloping intermediate portion may include an outer wall that is generally smooth and continuous over at least a majority of the area of the outer wall. The linear actuation screw may be a ball screw.

The first diameter of the threaded outer wall of the first end portion, the second diameter of the threaded outer wall of the second end portion, or both, may be generally constant over substantially the entire length of the first end portion, the second end portion, or both. The first diameter of the threaded outer wall of the first end portion, the second diameter of the threaded outer wall of the second end portion, or both, may be generally constant over only a portion of the length of the first end portion, the second end portion, or both. The average first diameter of the first end portion (as measured from a trough), or the minor diameter of the first end portion, may be different from an average second diameter of the second end portion (as measured from a trough), or the minor diameter of the second end portion. A portion of the first end portion may have a different diameter than the first diameter of the first end portion. The different diameter portion may be adapted to be supported by a carriage of a linear actuator.

The threaded outer wall of the first end portion, the threaded outer wall of the second end portion, or both, may be threaded over only a portion of the first end portion, the second end portion, or both. The threaded outer wall of the first end portion, the threaded outer wall of the second end portion, or both, may be threaded over greater than 50 percent of the length of the first end portion, the second end portion, or both. The threaded outer wall of the first end portion, the threaded outer wall of the second end portion, or both, may be threaded over substantially the entire first end portion, the second end portion, or both. There may be a portion that is unthreaded between the first end portion and the second end portion.

The sloping intermediate portion may have a slope between about 5 degrees and about 10 degrees relative to a longitudinal axis of the linear actuation screw. The sloping intermediate portion may have a generally constant slope over a majority of its length. A ratio of the length of the second end portion to a length of the sloping intermediate portion may be about 3.3:1 to about 0.7:1.

The linear actuation screw may be adapted to penetrate at least partially through a through passage of a motor and be secured. The motor may include an encoder. An encoder journal may be located at and extend from the second end portion of the linear actuation screw along the longitudinal axis of the linear actuation screw for receipt within the encoder.

The present teachings also contemplate an assembly including the linear actuation screw and a motor fastening nut.

The present teachings further contemplate a method of assembling a motorized assembly including the linear actuation screw as disclosed herein. The method may include: providing a motor having a first end portion, a second end portion, and a through passage through which the linear actuation screw at least partially penetrates; inserting the linear actuation screw at least partially into the through passage from the first end portion of the motor; and securing the linear actuation screw within the motor by threadingly engaging the motor fastening nut onto the second end portion of the linear actuation screw. The sloping intermediate portion of the linear actuation screw may matingly engage a wall that defines the through passage. Upon securing the linear actuation screw within the motor by threadingly engaging the motor fastening nut onto the second end portion of the linear actuation screw, the motor may require no further assembly steps for operation.

The first end portion of the motor may include a motor plate for at least partially enclosing the motor. The linear actuation screw may be inserted so that the sloping intermediate portion is longitudinally spaced within the motor at a distance of at least 3 mm from an outer wall of the motor plate. It is possible that the space between the sloping intermediate, portion and the outer wall of the motor plate may be no greater than a total length of the sloping intermediate portion. A motor cover plate structure may be added on the second end portion of the motor. An encoder may be added on the second end portion of the motor.

At least a portion of the linear actuation screw may be exposed during operation of the motor. A substantial portion (e.g., a majority) of the first end portion of the linear actuation screw may be located external of the motor. A substantial portion (e.g., a majority) of the first end portion may be free of any enclosure. The motorized assembly may be free of an adapter or coupling joining the linear actuation screw and the motor.

The present teachings also contemplate an actuator assembly including: the linear actuation screw; a carrier that carries the linear actuation screw; a motor that drives rotation of the linear actuation screw; and a linear slider for translating fore and aft along an axis that is generally parallel to the longitudinal axis of the linear actuation screw. The carrier may include a first end portion and a second end portion. The first end portion may have at least one end bearing. The first end portion of the carrier may support the first end portion of the linear actuation screw. The second end portion of the carrier may include the motor. The second end portion of the linear actuation screw may be attached directly to the motor and penetrate at least partially into the motor. The carrier may include a linear rail upon which the linear slider translates fore and aft.

The actuator assembly may be free of an intermediate support unit between the motor and the at least one end bearing (or the first end portion of the carrier). The assembly may be free of a motor bracket. The assembly may be free of an adapter or coupling (e.g., for joining the linear actuation screw to a motor shaft). The carrier may have an overall length, and the linear actuation screw may a travel length over the distance which a screw nut located on the linear actuation screw can travel. A ratio of the overall length of the carrier to the travel length of the linear actuation screw may be about 1.4:1 or less (e.g., about 1.3:1 or less). The actuator assembly may result in a reduction of overall length of at least 15%, at least 20%, or more, as compared with a traditional structure having an intermediate support unit.

The present teachings provide a number of technical benefits, including but not limited to, providing a screw that directly mates with a motor for eliminating the need for a coupling between the screw shaft and a motor shaft, reducing the footprint of an assembled linear actuator assembly, reducing the number of parts needed (e.g., by reducing or eliminating the need for an intermediate support unit containing one or more rolling bearings), or any combination of the foregoing.

DETAILED DESCRIPTION

Figure 1:
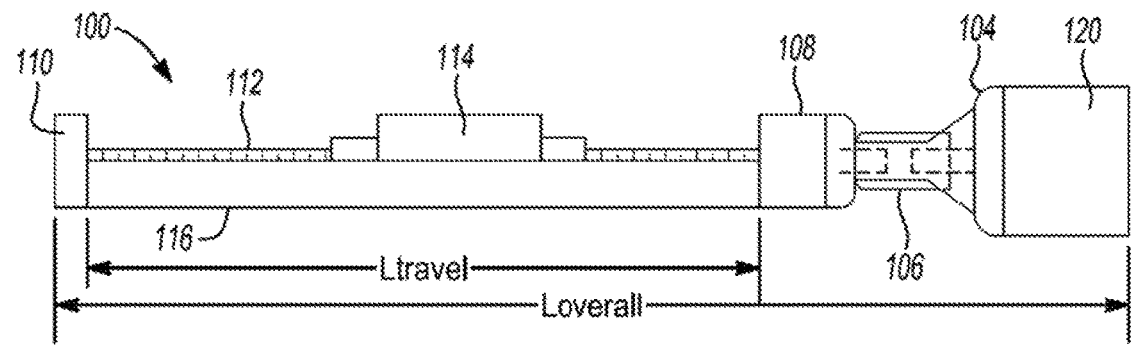
FIG. 1 is a side view of a traditional linear actuator assembly.

As required, details of the present teachings are disclosed herein; however, it is to be understood that the disclosed teachings are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, and as will be appreciated from the description that follows, the present teachings pertain to a simple, yet elegant, approach to the construction of an improved linear actuation screw which may be employed within a linear actuator. The present teachings also pertain to an improved linear actuation assembly where the screw shaft of the actuator is directly connected to a rotational part of a motor without requiring an additional coupling element.

The present teachings help to enable linear motion due to translation along the length of a screw, such as a screw having one or more threaded portions (e.g., a helically threaded screw). A rotary motion of the screw around an axis of rotation generally is converted to a linear motion of a nut and/or a slider assembly. The screw may have a longitudinal axis, and the screw may be rotated generally about the longitudinal axis of the screw. For example, the screw may be a component of a linear actuator and rotated by a driving force provided by a driver such as a motor (e.g., an electric motor such as a stepper motor, a servo motor, or otherwise). The screw may be made of a metallic material (e.g., steel, stainless steel, copper, brass, bronze, aluminum, aluminum alloy, nickel, nickel alloy, or the like).

The screw may have one or more portions having a thread flank structure and at least one thread crest portion. The thread flank structure may have a generally opposing flank. The generally opposing flanks may be generally flat, arcuate, or a combination thereof, or may have plural flat and/or arcuate surfaces. The generally opposing flanks may be parallel or at an angle relative to each other (e.g., sloped) and may terminate at a crest portion that may be flat, pointed, curved, or any combination thereof. For example, the thread flank structure may include at least one external helical thread, which may have a sectional profile that may be generally rectangular, trapezoidal, triangular, a combination of curved and flat portions, or any combination. Such external threads may include a unified national thread, acme thread, national buttress thread, national standard taper pipe thread, ISO metric thread, any combination thereof, or the like.

The linear actuation screw may be a ball screw. The ball screw may include a ball nut that houses and recirculates balls, rollers, generally rounded or cylindrical units, or other elements. The interface between the linear actuation screw and the ball nut may be made by the balls, rollers, or other elements that roll within the grooves of the threading of the screw (e.g., the threading of the first end portion of the linear actuation screw). The profile the linear actuation screw may have a plurality of ball grooves defining the threaded structure of at least a portion of the screw (e.g., the first end portion). The ball grooves may be of a shape that receives and guides the balls, rollers, or the like that are recirculated through the ball nut to provide linear motion. The ball grooves may be generally rounded. The ball grooves may have generally rounded or arcuate segments. For example, the ball grooves may be a gothic arch ball groove.

The linear actuation screw of the present teachings includes an elongated shaft that has a first end portion and a second end portion (e.g., on the opposing side of the elongated shaft, on an opposing side of a sloping intermediate portion, or both). Between the first end portion and second end portion may be a sloping intermediate portion. The length and diameter of the portions of the linear actuation screw may be dependent upon the application (e.g., what is being linearly transferred, the size and power of the motor).

The first end portion of the linear actuation screw may be measured from a terminal end of the linear actuation screw to the area adjacent the sloping intermediate portion. The first end portion may be the longest portion of the linear actuation screw (i.e., longer than the second end portion and longer than the sloping intermediate portion). The first end portion may be configured for advancing a nut, linear slider, or other moving element along at least a portion of the first end portion. The first end portion of the linear actuation screw may serve as the area upon which a nut, linear slider, or other moving element is positioned and can translate fore and aft along an axis that is coaxial with or generally parallel to the longitudinal axis of the linear actuation screw.

The first end portion may include a threaded outer wall over at least a portion of its length. The threading may permit balls, rollers, or other elements, held and recirculated by a ball nut situated on the first end portion, to travel within the grooves (or between flank structures). The first end portion may be threaded only along the portions of the linear actuation screw where a ball nut, a sliding member, or other moving element is desired to or is permitted to translate. The first end portion may be threaded over only a portion of the first end portion. The first end portion may be threaded over about 50 percent or more of its length. The first end portion may be threaded over substantially the entire first end portion. The pitch of the threads may be about 0.25 mm or more, about 1 mm or more, about 2 mm or more, or about 3 mm or more. The pitch of the threads may be about 10 mm or less, about 9 mm or less, or about 8 mm or less.

The first end portion may have a threaded outer wall having a generally constant first diameter (e.g., as measured from a crest of the one or more threads surrounding the first end portion), where the first diameter is the major diameter, over at least a portion of its length. The first diameter may be about 2 mm or more, about 4 mm or more, or about 6 mm or more. The first diameter may be about 12 mm or less, about 10 mm or less, or about 8 mm or less. The first diameter of the threaded outer wall of the first end portion may be generally constant over substantially the entire length of the first end portion. The first diameter of the threaded outer wall of the first end portion may be generally constant over only a portion of the length of the first end portion. The threaded outer wall of the first end portion may have a generally constant minor diameter (i.e., the smallest material diameter of a screw thread) over at least a portion of its length. The minor diameter of the threaded outer wall of the first end portion may be generally constant over substantially the entire length of the first end portion.

The first end portion may include a portion that is a different diameter than the generally constant first diameter (e.g., the major diameter), the generally constant minor diameter, or both. The different diameter portion may be generally unthreaded, generally smooth, or both. The different diameter portion may be adapted to be supported by a carriage of a linear actuator. For example, a different diameter portion may be located at the terminal end (i.e., free end) of the first portion. The different diameter portion may be supported by an end support of a carrier in an actuator assembly. The different diameter portion may be permitted to rotate within the end support (e.g., via one or more bearings, such as one or more simple end bearings located on or within the end support).

A second end portion of the linear actuation screw may be located on the opposing side of the linear actuation screw as the first end portion, located on an opposing side of a sloping intermediate portion, or both. The linear actuation screw may terminate at the end of the second end portion. The second end portion may be configured to be inserted into a through passage of a motor. The second end portion may be configured to receive a motor fastening nut around it in order to secure the linear actuation screw to a motor.

The second end portion may include a threaded outer wall over at least a portion of its length. The threading may permit a motor fastening nut to be threadingly engaged with the second end portion to secure the linear actuation screw within a motor. The second end portion may be threaded over only a portion of the second end portion. The second end portion may be threaded over about 50 percent or more of its length. The second end portion may be threaded over substantially the entire second end portion. There may be one or more unthreaded areas between the first end portion and the second end portion.

The second end portion may have a threaded outer wall having a generally constant second diameter (e.g., as measured from a crest of the one or more threads surrounding the second end portion), where the second diameter is the major diameter, over at least a portion of its length. The second diameter may be about 2 mm or more, or about 3 mm or more. The second diameter may be about 6 mm or less, or about 5 mm or less. The second diameter may be between about 3 mm and about 5 mm. For example, the second end portion may have M4 threads, where M is the nominal outer diameter of the screw in millimeters for ISO metric screw threads (i.e., 4 mm threaded portions). The second diameter of the threaded outer wall of the second end portion may be generally constant over substantially the entire length of the second end portion. The second diameter of the threaded outer wall of the second end portion may be generally constant over only a portion of the length of the second end portion. The threaded outer wall of the second end portion may have a generally constant minor diameter (i.e., the smallest material diameter of a screw thread) over at least a portion of its length. The minor diameter of the threaded outer wall of the second end portion may be generally constant over substantially the entire length of the second end portion. The second end portion may have a generally constant second diameter that is different from the first diameter of the first end portion. The second diameter, the minor diameter of the second end portion, or both, may be smaller than the first diameter, the minor diameter of the first end portion, or both.

The linear actuation screw may include a sloping intermediate portion joining the first end portion and the second end portion. The sloping intermediate portion may be adapted to be received within the through passage of the motor of a linear actuation assembly. The sloping intermediate portion may contact one or more of the walls defining the through passage of the motor. The walls may defining the through passage of the motor may be rotational elements of the motor. The through passage of the motor may include a tapered portion that generally matches the slope and dimensions of the sloping intermediate portion to mate the linear actuation screw to the motor (i.e., without a coupling joining the linear actuation screw and a motor shaft).

The sloping intermediate portion may include portions that are threaded. The sloping intermediate portion may be threaded over substantially its entire length. The sloping intermediate portion may be textured to provide a frictional surface to reduce slipping of the sloping intermediate portion within a through passage of a motor. Preferably, the sloping intermediate portion may include an outer wall that is generally smooth and continuous over at least a portion, over at least a majority, or over substantially the entirety of the area of the outer wall. The sloping intermediate portion may be free of, or substantially free of (e.g., about 10% or less, about 5% or less, or about 2% or less of the length), threading.

The diameter of the sloping intermediate portion may decrease as it extends from the first end portion toward the second end portion. The portion of the sloping intermediate portion having the largest diameter may be generally equal to or less than the first diameter (or the average first diameter) of the first end portion. The portion of the sloping intermediate portion having the largest diameter may be generally equal to the minor diameter (or average minor diameter) of the first end portion. The portion of the sloping intermediate portion having the smallest diameter may be generally equal to or greater than the second diameter (or the average second diameter) of the second end portion. The portion of the sloping intermediate portion having the smallest diameter may be generally equal to the minor diameter (or average minor diameter) of the second end portion.

The sloping intermediate portion may have a slope that is measured relative to the longitudinal axis of the linear actuation screw. The slope may be generally constant over a majority of the length of the linear actuation screw. The sloping intermediate portion may form an angle of about 2 degrees or more, about 4 degrees or more, or about 5 degrees or more with the longitudinal axis of the linear actuation screw. The sloping intermediate portion may form an angle of about 14 degrees or less, about 12 degrees or less, about 10 degrees or less, or about 8 degrees or less. For example, the slope may be about 7 degrees relative to the longitudinal axis of the linear actuation screw.

The sloping intermediate portion may have a length that is longer than the length of the second end portion. The sloping intermediate portion may have a length that is shorter than the length of the second end portion. The sloping intermediate portion may have a length that is approximately equal to the length of the second end portion. A ratio of the length of the second end portion to a length of the sloping intermediate portion may be about 4:1 to about 0.5:1 (e.g., about 3.3:1 to about 0.7:1).

The sloping intermediate portion is preferably integrally formed with the linear actuation screw. However, it is also contemplated that the sloping intermediate portion can be created on an existing screw via a tapered adapter. The tapered adapter may have a generally conical or frustoconical exterior surface. The tapered adapter may be generally hollow. The tapered adapter may have a generally constant inner diameter. The inner diameter may remain fixed before and after assembly with the screw. The tapered adapter may maintain its shape before and after assembly with the screw, before and after being inserted into a motor, or both. For example, the tapered adapter may be incapable of enlarging relative to a longitudinal axis. The tapered adapter may be positioned over a portion of a linear actuation screw (e.g., over the second end portion, adjacent to the first end portion) to provide a sloping intermediate portion between a first end portion and a second end portion. A portion of the linear actuation screw (e.g., the second end portion) may extend beyond the tapered adapter (e.g., the portion of the tapered adapter having the smallest outer diameter). The tapered adapter may serve to provide a strong and/or correct mating between the motor (e.g., the through passage of the motor and the walls defining the through passage) and the linear actuation screw.

The linear actuation screw may include one or more interface portions. The interface portion may act as a shoulder of the linear actuation screw. The interface portion may serve as a stopper (i.e., to inhibit the linear actuation screw from penetrating the through passage of the motor further). The interface portion may have an outer diameter that is larger than the first diameter of the first end portion, larger than the second diameter of the second end portion, or both. The interface portion may be a ring or nut around the screw. The interface portion may be integrally formed with the linear actuation screw. The interface portion may be a separate element secured around the liner actuation screw. The interface portion may be located on the first end portion. The interface portion may be located between the first end portion and the second end portion of the linear actuation screw.

The linear actuation screw may include one or more features for allowing the screw to be secured within an assembly. The features may cause the linear actuation screw to be held in place (e.g., prevented from rotating) while the linear actuation screw is being installed or secured within the motor (e.g., by securing the motor fastening nut to the linear actuation screw). The linear actuation screw may include one or more generally flat portions (e.g., wrench flats). The generally flat portions may be located on the first end portion of the linear actuation screw (e.g., toward the sloping intermediate portion) or between the first end portion and the second end portion of the linear actuation screw. The flat portions may allow the linear actuation screw to be gripped (e.g., by a wrench or other clamping device), such as during installation. For example, by gripping the linear actuation screw, the screw is prevented from rotating while the motor fastening nut is being threadingly secured on the second end portion of the linear actuation screw. The linear actuation screw may include a socket end (e.g., a hex socket end) located at the terminal end (or the free end) of the first end portion of the linear actuation screw. The socket end may receive a wrench (e.g., a hex key), which may cause the linear actuation screw to rotate, or can be used to make the linear actuation screw remain in position (e.g., not rotate).

The linear actuation screw may include an encoder journal extending from the terminal end of the second end portion. The encoder journal may function to be received within an encoder attached to the motor for measuring rotation of the rotation elements of the motor, rotation of the linear actuation screw, or both. The encoder journal may extend away from the second end portion along the longitudinal axis of the linear actuation screw. The encoder journal may be of a sufficient length to extend through the through passage of the motor and beyond the motor (i.e., so that the end of the encoder journal is visible outside of the motor if the encoder was not secured to the motor). The encoder journal may be integrally formed with the linear actuation screw. The encoder journal may be part of the screw shaft, so that the encoder journal and the other portions of the linear actuation screw are made from a single piece of material. The encoder journal may be separately attached to the linear actuation screw. The encoder journal may generally be free of threads. The encoder journal may include one or more threaded portions over a portion or all of its length. The encoder journal may have a generally constant diameter. The encoder journal may have a diameter that is generally equal to the second diameter of the linear actuation screw. Preferably, the encoder journal diameter may be generally less than the second diameter of the linear actuation screw (e.g., to allow for the motor fastening nut to pass over the length of encoder journal to be secured to the second end portion of the linear actuation screw). The encoder journal may have a diameter that is generally larger than or equal to the minor diameter of the second end portion. The encoder journal may have a diameter that is generally smaller than the minor diameter of the second end portion.

The present teachings contemplate the use of the linear actuation screw as disclosed herein in a motorized assembly. The motorized assembly may include the linear actuation screw and a motor. The motor may include a first end portion, a second end portion, and a through passage through which the liner actuation screw is adapted to at least partially penetrate. The motor may be a stepper motor, a servo motor, or other. The through passage of the motor may extend from the first end portion of the motor through to the opposing second end portion of the motor. The opening of the second end portion of the motor (i.e., defining the through passage) may be large enough to allow access to the through passage and/or portions of the linear actuation screw (e.g., the second end portion, the encoder journal, or both). The opening of the second end portion may be large enough to receive the motor fastening nut. The opening may have a diameter measuring about 4 mm or more, about 5 mm or more, or about 6 mm or more. The opening may have a diameter measuring about 12 mm or less, about 10 mm or less, or about 9 mm or less. For example, the opening may have a diameter of about 8 mm. At least a portion of the though passage may be generally tapered (e.g., to receive and/or engage the sloping intermediate portion). The motor may include a cover plate on the first end portion, the second end portion, or both.

The motor may include an encoder secured thereto. For example, an encoder may be clamped or otherwise secured to the second end portion of the motor. The encoder may be adapted to receive an encoder journal extending from the second end portion of the linear actuation screw for measuring the rotation of the screw, the rotation of the rotating elements of the motor, or a combination thereof.

The present teachings also contemplate a method of assembling a motorized assembly including the linear actuation screw as described herein. The linear actuation screw may be directly connected to the motor (e.g., the motor rotation portion) by inserting the linear actuation screw at least partially into the through passage of the motor from the first end portion. The linear actuation screw may be secured within the motor by threadingly engaging a motor fastening nut onto the second end portion of the linear actuation screw. The motor fastening nut may be inserted through the opening defining the through passage at the second end portion of the motor. The motor fastening nut, having a threaded hollow portion, may receive and engage a portion of the linear actuation screw (e.g., the second end portion). The diameter of the hollow portion of the motor fastening nut may be greater than the diameter of an encoder journal and/or the free end of the linear actuation screw (i.e., at or near the second end portion of the screw) to allow the motor fastening nut to be slid over portions of the screw until it can be put into threading engagement with the threaded portion of the second end portion of the linear actuation screw. The sloping intermediate portion of the screw may matingly engage a wall defining the through passage. Upon securing the linear actuation screw within the motor by threadingly engaging the motor fastening nut onto the second end portion of the linear actuation screw, it is contemplated that the motor may require no further assembly steps for operation. The motorized assembly may be free of any adapter or coupling joining the linear actuation screw and the motor.

During operation of the motor, at least a portion of the linear actuation may be exposed. A substantial portion (e.g., a majority) of the first end portion of the linear actuation screw may be located external of the motor and may be free of any enclosure. Other portions of the linear actuation screw (e.g., the second end portion, the sloping intermediate portion, or both) may be received within and/or concealed by the motor. The motor may include a motor plate (on the first end portion of the motor, the second end portion of the motor, or both) for at least partially enclosing the motor. The linear actuation screw may be inserted so that the sloping intermediate portion is longitudinally spaced within the motor at a distance from an outer wall of the motor plate (e.g., about 0.5 mm or more, about 1 mm or more, or about 2 mm or more; about 6 mm or less, about 5 mm or less, or about 4 mm or less). It is contemplated, that the space between the sloping intermediate portion and the outer wall of the motor plate may be no greater than a total length of the sloping intermediate portion.

The linear actuator may include suitable structure for supporting the linear actuation screw as described herein for rotation. The actuator assembly may include a carrier that carries the linear, actuation screw. The actuator assembly may include the motor, which drives rotation of the linear actuation screw. The actuator assembly may include a linear slider for translating fore and aft along an axis that is generally coaxial with or generally parallel to the longitudinal axis of the linear actuation screw.

The carrier may include a first end portion and a second end portion. The first end portion may have at least one end bearing. The first end portion of the carrier may support the first end portion of the linear actuation screw. The second end portion of the carrier may include the motor. The second end portion of the linear actuation screw may be attached directly to the motor and penetrate at least partially into the motor. The motor may include one or more bearings for supporting and/or permitting rotation of the second end portion within the motor. The rotation portion of the motor may be supported by one or a set of preloaded or non-preloaded bearings and/or simple end bearings.

The linear actuator may also have suitable structure for maintaining the linear slider in a stable position and for allowing the slider to translate fore and aft in a direction that is generally parallel to or coaxial with the longitudinal axis of the linear actuation screw. For example, the linear actuator may include at least one elongated linear rail having a longitudinal axis, a base, and optionally a pair of opposing side walls projecting outwardly from the base. The motor or other driver and linear actuation screw may be located between the opposing side walls. The linear actuation screw may be directly connected to and secured within the motor or other driver and in driving relationship with the motor so that the motor is adapted to rotate the linear actuation screw generally about the longitudinal axis of the screw.

The linear slider may include or may be attached to the ball nut of the linear actuation screw (e.g., the ball nut of a ball screw). The linear slider may have one or more guide structures adapted for engaging a rail of the linear actuator. The guide structures may also resist separation of the linear slider from the rail during operation. A guide structure may slidingly attach the linear slider to the rail, for example by way of bearings that rollingly engage the rail (e.g., miniature ball bearings, roller bearings, or the like). The bearings may be mounted to the linear slider, such as at or near an edge of the linear slider or at some other location on the linear slider.

The assembly may be free of an intermediate support unit between the motor and the at least one end bearing (at the first end portion of the carrier). The assembly may be free of an adapter or coupling joining the linear actuation screw to a motor shaft (e.g., a rotational shaft of the motor). The assembly may be free of a motor bracket joining the motor to the carrier. The absence of any, all, or a combination of these features may permit the footprint of the carrier to be smaller than a traditional linear actuator assembly. The present teachings contemplate the carrier having an overall length. The linear actuation screw has a travel length over the distance which a screw nut and/or a linear slider located on the linear actuation screw can travel. The ratio of the overall length of the carrier to the travel length of the linear actuations crew may be about 1.4:1 or less (e.g., about 1.3:1 or less). The actuator assembly may result in a reduction of overall length of at least 15%, at least 20%, or more, as compared with a tradition structure (e.g., a structure having an intermediate support unit, a motor bracket, and/or a coupling).

Turning now to the figures, FIG. 1 illustrates a traditional linear actuator assembly. The traditional assembly 100 includes an end support 110 at one end and a motor bracket 104 and a motor 120 at the opposing end. A linear rail 116 extends along at least a portion of the length of the assembly 100. The motor bracket 104 attaches the motor 120 to the linear rail 116 of the assembly 100. A screw 112 is supported at one end by the end support 110 and by an intermediate support unit 108 toward the opposing end of the screw. The intermediate support unit 108 also includes preloaded rolling bearings (not shown) for supporting screw shaft rotation movement and for taking the axial load. A linear slider 114 travels along the length of the screw 112 and is also supported by the linear rail 116. The screw 112 is joined to the motor 120 (i.e., the motor shaft of the motor) via a coupling 106. Therefore, the traditional assembly 100 has three rotational parts: the shaft in the motor 120, the shaft of the screw 112, and the coupling 106 connecting them. The overall length of the traditional assembly is shown as $L_{overall}$. The length the linear slider 114 is permitted to travel along the screw 112 is shown as $L_{travel}$.

Figure 2:
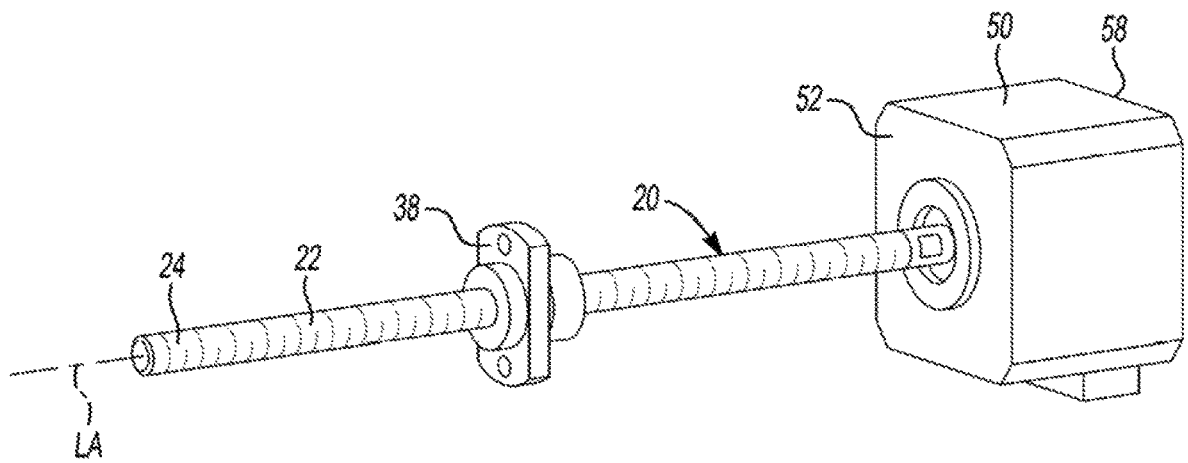
FIG. 2 illustrates a motorized assembly including a linear actuation screw of the present teachings.

FIG. 2 illustrates a linear actuation screw 20 of the present teachings. The linear actuation screw 20 has an elongated shaft 22 which has a longitudinal axis LA. The linear actuation screw 20 rotates about the longitudinal axis LA, and rotation of the linear actuation screw 20 is driven by a motor 50. The linear actuation screw 20 has a first end portion 24, which is generally exposed (i.e., not concealed by the motor 50). The linear actuation screw 20 as illustrated is a ball screw and also includes a ball nut 38. To engage with the motor 50, the second end portion 30 and sloping intermediate portion 34 (see FIGS. 3A and 3B) of the linear actuation screw 20 are inserted into the first end portion of the motor 52. The motor 50 has an opposing second end portion 58. The threading of the linear actuation screw has been omitted for clarity of the remainder of the figure.

Figure 3A:
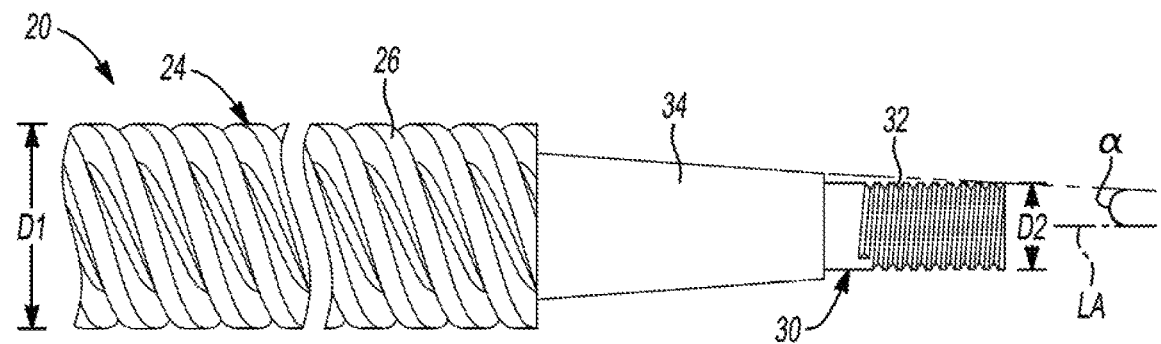
FIGS. 3A and 3B is a side view of a partial linear actuation screw of the present teachings.
Figure 3B:
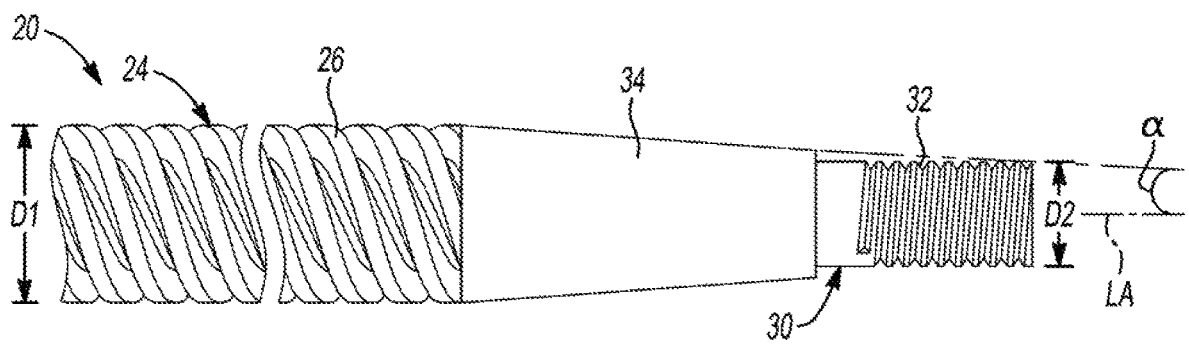

FIGS. 3A and 3B illustrate a linear actuation screw 20 of the present teachings. FIGS. 3A and 3B illustrate a portion of the first end portion 24 of the linear actuation screw 20, which has a threaded outer wall 26. The first end portion 24 has a generally constant diameter D1 as measured from the crests of the threaded outer wall 26. On the opposing end of the linear actuation screws 20 are a second end portion 30, having a threaded outer wall 32. The second end portion 30 has a generally constant diameter D2, as measured from the crests of the threaded outer wall 32, which is smaller than the generally constant diameter D1 of the first end portion 24 of the linear actuation screw 20. The linear actuation screw 20 includes a sloping intermediate portion 34 located between the first end portion 24 and the second end portion 30. The slope of sloping intermediate portion 34 may be measured in degrees by the angle α formed between a plane extending generally along and beyond the sloping intermediate portion 34 and the longitudinal axis LA of the linear actuation screw 20. As illustrated in FIGS. 3A and 3B, the sloping intermediate portion 34 is free of threading and may be generally smooth. The portion of the sloping intermediate portion 34 having the largest diameter, shown here where the sloping intermediate portion 34 connects to the first end portion 24, may be generally the same diameter as the generally constant diameter D1 of the first end portion 24, as shown in FIG. 3B. The largest diameter portion of the sloping intermediate portion 34 may be smaller than the generally constant diameter D1 of the first end portion 34, as shown in FIG. 3A.

Figure 4:
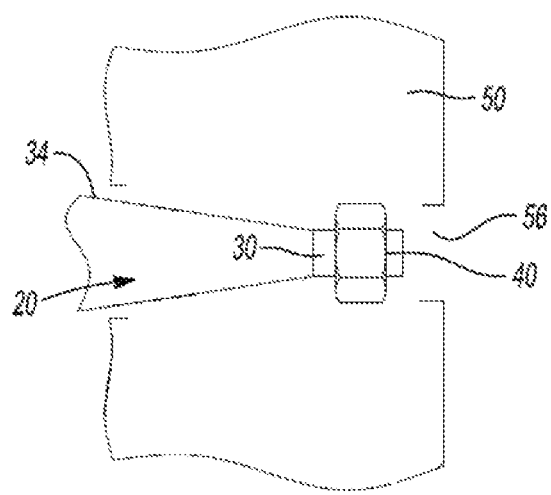
FIG. 4 is a partial cutaway view of a portion of the linear actuation screw of the present teachings received within a motor.

FIG. 4 is a partial cutaway view of a linear actuation screw 20 received within a through passage 56 of a motor 50. As shown in FIG. 2, the linear actuation screw 20 is inserted into the through passage 56 at the first end portion 52 of the motor 50. The through passage 56 is shaped in such a way to accommodate the sloping intermediate portion 34 of the linear actuation screw 20. The linear actuation screw 20 is secured within the motor 50 by a motor fastening nut 40 that is in threading engagement with the second end portion 30 (i.e., at the threaded outer wall 32 as shown in FIGS. 3A and 3B).

Figure 5:
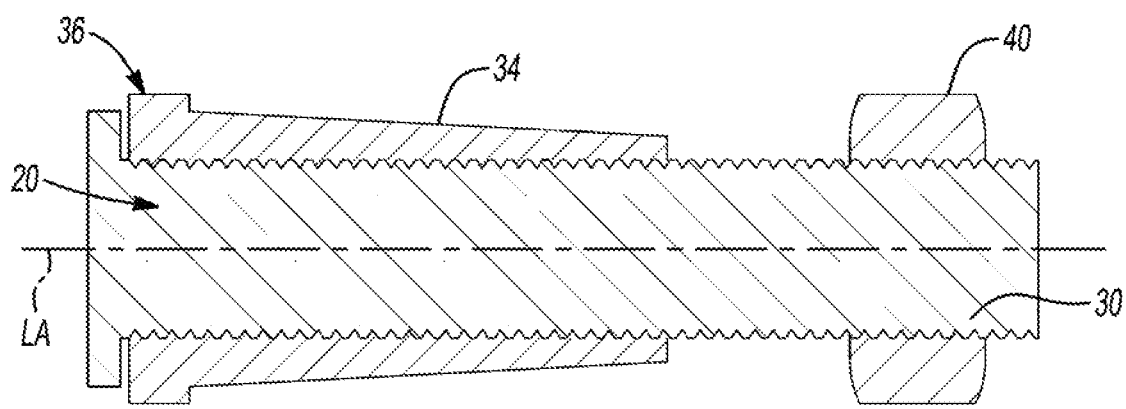
FIG. 5 illustrates a longitudinal cross section of a linear actuation screw of the present teachings having a sloping intermediate portion by way of a tapered adapter.

FIG. 5 illustrates a longitudinal cross section of a linear actuation screw 20 having a sloping intermediate portion 34 by way of a tapered adapter 36. The tapered adapter 36 has a constant inner diameter and is positioned upon the linear actuation screw 20. The motor fastening nut 40 is then secured on the second end portion 30 of the linear actuation screw 20 to secure the linear actuation screw within the motor (not shown). The tapered adapter 36 may provide a sloping intermediate portion 34 forming an angle α (as shown in FIGS. 3A and 3B) with the longitudinal axis LA of the linear actuation screw 20.

Figure 6A:
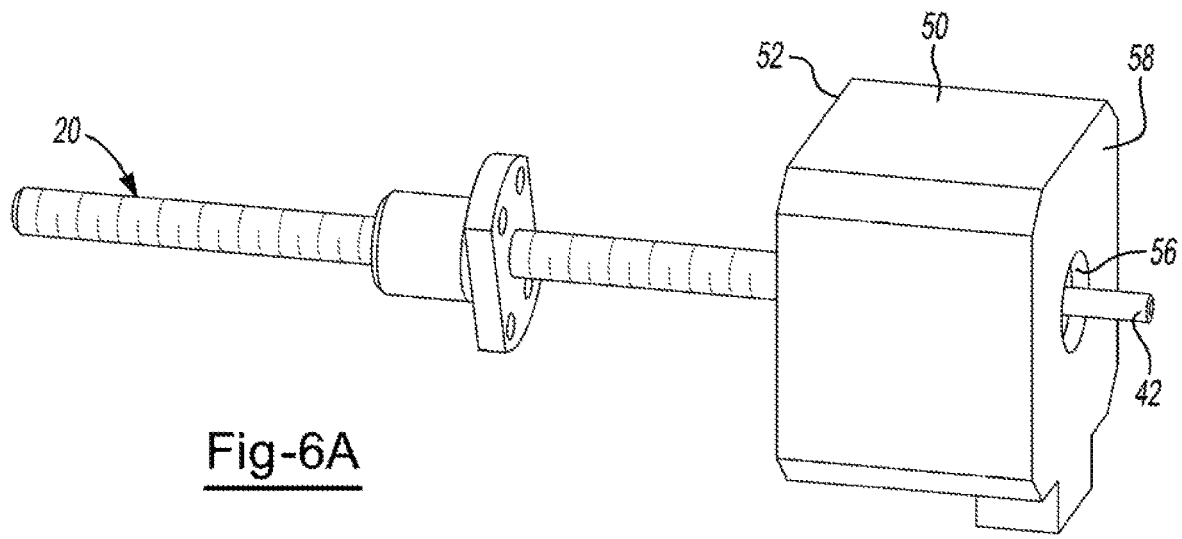
FIG. 6A illustrates a motorized assembly including a linear actuation screw of the present teachings including an encoder journal extending therefrom.
Figure 6B:
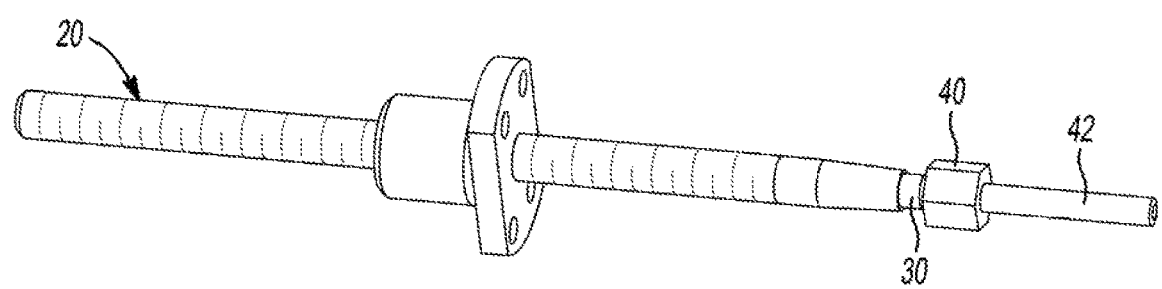
FIG. 6B illustrates the linear actuation screw of FIG. 6A with the motor omitted.
Figure 6C:
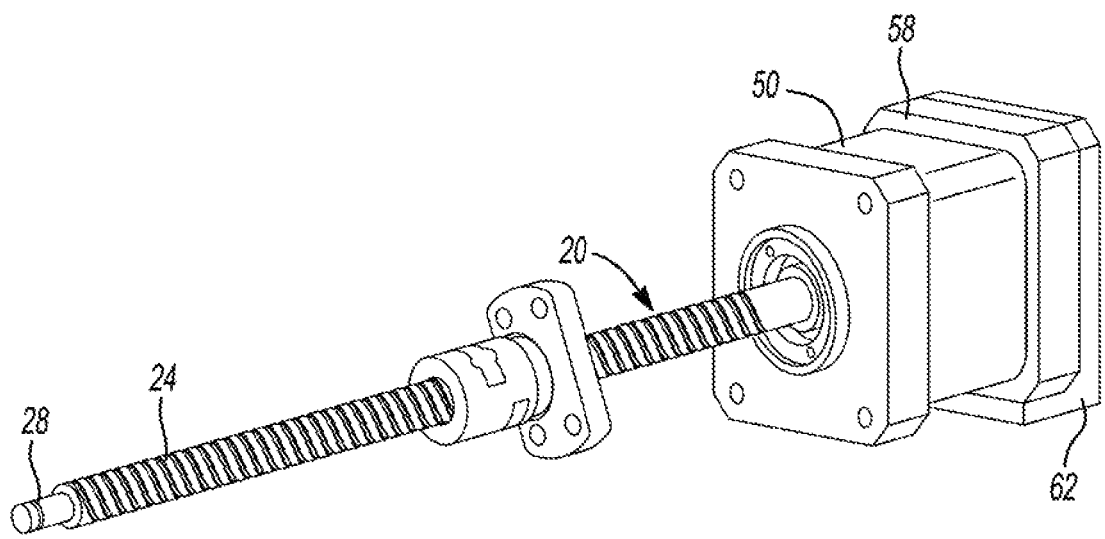
FIG. 6C illustrates a motorized assembly including a linear actuation screw of the present teachings and an encoder attached to the motor.

FIGS. 6A, 6B and 6C illustrate a linear actuation screw 20 having an encoder journal 42 extending from the second end portion 30. FIG. 6A illustrates the linear actuation screw 20 extending into a motor 50. The motor 50 includes a through passage 56 for receiving a portion of the linear actuation screw 20. The through passage 56 extends from the first end portion 52 of the motor 50 through the second end portion 58 of the motor 50 on the opposing side. The encoder journal 42 extending from the linear actuation screw 20 extends beyond the second end portion 58 of the motor 50 to be received within an encoder 62 (FIG. 6C) for measuring rotation, which is attached to the second end portion 58 of the motor 50. FIG. 6B illustrates the linear actuation screw 20 of FIG. 6A with the motor omitted. As shown, the motor fastening nut 40 is threadingly engaged with the second end portion 30 of the linear actuation screw 20 for securing the screw within the motor. The encoder journal 42 extends from the second end portion 30 of the screw. The linear actuation screw 20 of FIG. 6C illustrates a different diameter portion 28 than the diameter of the rest of the first end portion 24. The different diameter portion is adapted to be supported by a first end portion 74 of a carrier 72 within an actuator assembly 70 (see FIG. 7).

Figure 7:
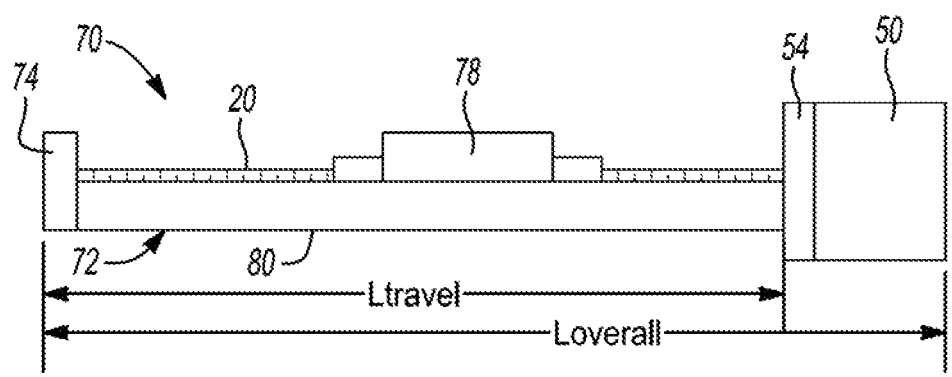
FIG. 7 illustrates an actuator assembly including the linear actuation screw of the present teachings.

FIG. 7 illustrates an exemplary actuator assembly 70 of the present teachings. The actuator assembly includes a linear actuation screw 20 supported by a carrier 72. The first end portion of the linear actuation screw 20 is supported by a first end portion 74 of the carrier 72. The opposing end of the linear actuation screw (i.e., the sloping intermediate portion and the second end portion as shown in FIGS. 3A and 3B) is inserted into the motor 50. The motor 50 includes a motor plate 54. The carrier 72 includes a linear rail 80, which extends between the first end portion 74 of the carrier 72 and the motor 50. A linear slider 78 (positioned on or including the ball nut 38 as shown in FIG. 2) translates fore and aft along the length of the linear actuation screw 20 and is further supported by the linear rail 80. The overall length of the actuator assembly 70 is shown as $L_{overall}$. The length the linear slider 78 is permitted to travel along the linear actuation screw 20 is shown as $L_{travel}$. As seen when comparing with the traditional assembly of FIG. 1, the ratio of $L_{overall}$ to $L_{travel}$ is improved, providing a smaller difference between the $L_{overall}$ and $L_{travel}$ in the exemplary actuator assembly 70 of the present teachings.

Among other differences relative to prior technologies, the teachings envision linear actuators that are free of a coupling joining the screw shaft to a motor shaft; an intermediate support unit between the first end portion of the carrier and the motor; a motor bracket joining the motor to the assembly; or any combination thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to N, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

What is claimed is:

1. A linear actuation screw comprising an elongated shaft having a first end portion, a second end portion on an opposite side of the elongated shaft as the first end portion, and a sloping intermediate portion between the first end portion and the second end portion, wherein:
  1a) the first end portion has a threaded outer wall having a generally constant first diameter as measured from a crest over at least a portion of its length and is configured to advance a nut or a sliding member along at least a portion of the first end portion;
  1b) the second end portion has a threaded outer wall having a generally constant second diameter that is different from the first diameter and is configured to receive a motor fastening nut around it in order to secure the linear actuation screw to a motor; and
  1c) the sloping intermediate portion includes an outer wall that is generally smooth and continuous over at least a majority of the area of the outer wall;

wherein rotation of the linear actuation screw is adapted to be driven by a motor.

2. The linear actuation screw of claim 1, wherein:
2a) the first diameter of the threaded outer wall of the first end portion is generally constant over substantially the entire length of the first end portion;
2b) the second diameter of the threaded outer wall of the second end portion is generally constant over substantially the entire length of the second end portion; or
both 2a) and 2b).

3. The linear actuation screw of claim 1, wherein:
3a) the threaded outer wall of the first end portion is threaded over only a portion of the first end portion;
3b) the threaded outer wall of the second end portion is threaded over only a portion of the second end portion: or
both 3a) and 3b).

4. The linear actuation screw of claim 1, wherein:
4a) the threaded outer wall of the first end, portion is threaded over greater than 50 percent of the length of the first end portion;
4b) the threaded outer wall of the second end portion is threaded over greater than 50 percent of the length of the second end portion; or
both 4a) and 4b).

5. The linear actuation screw of claim 1, wherein a portion is unthreaded between the first end portion and the second end portion.

6. The linear actuation screw of claim 1, wherein an average first diameter of the first end portion as measured from a trough is different from an average second diameter of the second end portion as measured from a trough.

7. The linear actuation screw of claim 1, wherein the sloping intermediate portion has a slope between about 5 degrees and about 10 degrees relative to a longitudinal axis of the linear actuation screw.

8. The linear actuation screw of claim 7, wherein the sloping intermediate portion has a generally constant slope over a majority of its length.

9. The linear actuation screw of claim 1, wherein a ratio of the length of the second end portion to a length of the sloping intermediate portion is about 3.3:1 to about 0.7:1.

10. The linear actuation screw of claim 1, wherein the linear actuation screw is adapted to penetrate through an opening at a first end portion of the motor at least partially through a through passage of and be secured.

11. The linear actuation screw of claim 10, wherein an encoder journal is located at and extends from the second end portion of the linear actuation screw along the longitudinal axis of the linear actuation screw for receipt within an encoder secured to a second portion of the motor opposite the first end portion of the motor.

12. The linear actuation screw of claim 1, wherein the linear actuation screw is a ball screw.

13. An actuator assembly comprising:
i) a linear actuation screw comprising: an elongated shaft having a first end portion, a second end portion on an opposite side of the elongated shaft as the first end portion, and a sloping intermediate portion between the first end portion and the second end portion, wherein:
the first end portion has a threaded outer wall having a generally constant first diameter as measured from a crest over at least a portion of its length and is configured to advance a nut of a sliding member along at least a portion of the first end portion;
the second end portion has a threaded outer wall having a generally constant second diameter that is different from the first diameter and is configured to receive a motor fastening nut around it in order to secure the linear actuation screw to a motor; and
the sloping intermediate portion includes an outer wall that is generally smooth and continuous over at least a majority of the area of the outer wall;
ii) a carrier that carries the linear actuation screw;
iii) a motor that drives rotation of the linear actuation screw, and
iv) a linear slider for translating fore and aft along an axis that is generally parallel to the longitudinal axis of the linear actuation screw.

14. The actuator assembly of claim 13, wherein the carrier includes a first end portion and a second end portion, the first end portion having at least one end bearing and supporting the first end portion of the linear actuation screw; the second end portion including the motor; and wherein the second end portion of the linear actuation screw is attached directly to the motor and penetrates at least partially into the motor.

15. The actuator assembly of claim 13, wherein the carrier includes a linear rail upon which the slider translates fore and aft.

16. The actuator assembly of claim 13, wherein the assembly is free of an intermediate support unit having preloaded bearings for supporting screw shaft rotation movement between the motor and the at least one end bearing.

17. The actuator assembly of claim 13, wherein the assembly is free of
a) a motor bracket joining the motor to the carrier;
b) an adapter or coupling joining the linear actuation screw and the motor; or
is free of both of a) and b).

18. The actuator assembly of claim 13, wherein the linear actuation screw is a ball screw.

19. The actuator assembly of claim 13, wherein the carrier has an overall length, and wherein the linear actuation screw has a travel length over the distance which a screw nut located on the linear actuation screw can travel; and wherein a ratio of the overall length of the carrier to the travel length of the linear actuation screw is about 1.4:1 or less and about 1:1 or greater.

20. The actuator assembly of claim 13, wherein the actuator assembly results in a reduction of overall length of at least 15% as compared with a traditional linear actuator assembly having an end support at one end, a motor bracket and a motor at an opposite end, a screw joined to the motor via a coupling, and an intermediate support unit having preloaded rolling bearings for supporting screw shaft rotation movement.

* * * * *